United States Patent
Chan et al.

(10) Patent No.: US 7,173,836 B2
(45) Date of Patent: Feb. 6, 2007

(54) CIRCUIT MAKING USE OF PUSH/PULL-TYPE CONTROL CHIP TO DRIVE HALF BRIDGE-TYPE INVERTER CIRCUIT

(75) Inventors: Chun-Kong Chan, Hsi Chih (TW); Jeng-Shong Wang, Taipei County (TW)

(73) Assignee: Lien Chang Electronic Enterprise Co., Ltd., Taipei County (TW)

( * ) Notice: Subject to any disclaimer, the term of this patent is extended or adjusted under 35 U.S.C. 154(b) by 234 days.

(21) Appl. No.: 10/935,128

(22) Filed: Sep. 8, 2004

(65) Prior Publication Data

US 2006/0050542 A1    Mar. 9, 2006

(51) Int. Cl.
*H02M 7/5387* (2006.01)

(52) U.S. Cl. ..................................... 363/132
(58) Field of Classification Search .................. 363/17, 363/98, 132
See application file for complete search history.

(56) References Cited

U.S. PATENT DOCUMENTS

| | | | | |
|---|---|---|---|---|
| 4,638,420 A | * | 1/1987 | Forge | 363/132 |
| 4,800,477 A | * | 1/1989 | Esposito | 363/17 |
| 5,019,770 A | * | 5/1991 | Harada et al. | 323/282 |
| 5,053,937 A | * | 10/1991 | Blockl | 363/16 |
| 5,539,630 A | * | 7/1996 | Pietkiewicz et al. | 363/17 |
| 6,452,816 B2 | * | 9/2002 | Kuranuki et al. | 363/17 |
| 6,567,279 B2 | * | 5/2003 | Brkovic | 363/17 |
| 7,064,588 B2 | * | 6/2006 | Chan et al. | 327/110 |
| 7,067,989 B2 | * | 6/2006 | Chan et al. | 315/224 |
| 2006/0076986 A1 | * | 4/2006 | Chan et al. | 327/112 |

* cited by examiner

*Primary Examiner*—Jeffrey Sterrett
(74) *Attorney, Agent, or Firm*—Rosenberg, Klein & Lee

(57) ABSTRACT

A circuit making use of a push/pull-type control chip to drive a half bridge-type inverter circuit connects a drive circuit to a conventional half bridge-type inverter circuit, and has a push/pull-type control chip having two output terminals, a drive circuit having two input terminals and two output terminals, and a half bridge-type switch assembly having two electronic switches. The two input terminals of the drive circuit are connected with the two output terminals of the push/pull-type control chip and controlled by the push/pull-type control chip. Each of the two electronic switches of the half bridge-type switch assembly has a control terminal, which is connected to one of the two output terminals of the drive circuit and driven by the drive circuit for converting a DC power source into an AC power source sent to the primary side of a transformer.

4 Claims, 8 Drawing Sheets

CIRCUIT MAKING USE OF PUSH/PULL-TYPE CONTROL CHIP TO DRIVE HALF BRIDGE-TYPE INVERTER CIRCUIT

FIELD OF THE INVENTION

The present invention relates to a circuit making use of a push/pull-type control chip to drive a half bridge-type inverter circuit and, more particularly, to an inverter circuit capable of using a push/pull-type control chip to control a half bridge-type inverter circuit.

BACKGROUND OF THE INVENTION

The power supply for a backlight source of a TFT LCD panel makes use of an inverter circuit to accomplish energy conversion and turn a cold cathode fluorescent lamp (CCFL) on. Conventional inverter circuits can be divided into half bridge-type, full-bridge type and push/pull-type according to different circuit topologies. An inverter circuit is a circuit for converting DC power into AC power.

As shown in FIG. 1, a transformer T1 divides the circuit into a front-end circuit at the primary side 101 and a rear-end circuit at the secondary side 102. The front-end circuit at the primary side 101 comprises a DC voltage source Vcc, a first switch Q1, and a second switch Q2. The rear-end circuit at the secondary side 102 comprises at least a capacitor (C1, C2, C3), a load, and at least a diode (D1, D2). A push/pull-type control chip 103 is connected between the front-end circuit at the primary side 101 and the rear-end circuit at the secondary side 102. Reference is also made to FIG. 2. The push/pull-type control chip 103 outputs a first control signal a and a second control signal b to turn switching actions of the two switches Q1 and Q2 at the primary side 101, respectively. The DC power source Vcc is used to provide energy, and the transformer T1 raises and converts the voltage of the DC power Vcc to the rear-end circuit 102 for driving the load. The output voltage waveform c at the secondary side of the transformer T1 is the voltage waveform at point C. As shown in FIG. 2, the output voltage waveform c at the secondary side is an AC voltage waveform.

In the above description, the push/pull-type control chip 103 can be the LX1686, LX1688 or LX1691 push/pull-type control chip produced by Linfinity (Microsemi) Corporation, the 02-9RR push/pull-type control chip produced by O2Micro International Limited, or the BIT3494 push/pull-type control chip produced by Beyond Innovation Technology.

As shown in FIG. 3, a transformer T2 divides the circuit into a front-end circuit at the primary side 201 and a rear-end circuit at the secondary side 202. The front-end circuit at the primary side 201 comprises a DC voltage source Vcc, two electronic switches (Q1, Q2), a half bridge-type control chip TL494, two capacitors (C1, C2) and an isolation transformer Tr. The rear-end circuit at the secondary side 202 comprises a load. Reference is also made to FIG. 4. The half-bridge control chip TL494 outputs control signals D1–D2 via two output terminals D1 and D2. The control signals D1–D2 control switching actions of the two electronic switches Q1 and Q2 via the isolation transformer Tr, respectively. The two electronic switches Q1 and Q2 are n-channel FETs or p-channel FETs. Through switching actions of the two electronic switches Q1 and Q2, electric energy stored in the capacitors C1 and C2 can be transferred to a primary side terminal T21 of the transformer T2 via a coupling capacitor C3 to form an AC power source ac. The voltage of the capacitors C1 and C2 is a half (Vcc/2) of the DC voltage Vcc. The AC power source ac is used to provide energy for the transformer T2, which boosts and converts the AC power source to the secondary side 202 for driving the load.

In the above description, if the inverter circuit used is of the half bridge-type, a half bridge-type control chip needs to be matched for normal operations, while if the used inverter circuit is of the push/pull-type, a push/pull-type control chip needs to be matched for normal operations, hence having less flexibility and commonality in practical use. In other words, control chips can't be jointly used and purchased together, or a more complicated circuit needs to be matched.

Further, for a conventional half bridge-type inverter circuit, an isolation transformer is required to control switching actions of two electronic switches. The half bridge-type control chip can't directly drive the two electronic switches. Moreover, both the two electronic switches used in a conventional half bridge-type inverter circuit are n-channel FETs or p-channel FETs.

SUMMARY OF THE INVENTION

Accordingly, one object of the present invention is to provide a circuit making use of a push/pull-type control chip to drive a half bridge-type inverter circuit. The circuit uses a drive circuit to connect output terminals of the push/pull-type control chip and control terminals of a half bridge-type switch assembly composed of two electronic switches. The circuit is controlled by the push/pull-type control chip for driving switching actions of the half bridge-type switch assembly.

In the circuit making use of a push/pull-type control chip to drive a half bridge-type inverter circuit of the present invention, a drive circuit is connected between two electronic switches of a conventional half bridge-type inverter circuit and a control chip. The control chip is replaced with a push/pull-type control chip to turn switching actions of the two electronic switches.

The drive circuit comprises a first acceleration diode, a second resistor, a second acceleration diode, and a third resistor. The negative terminal (N) of the first acceleration diode is connected to an output terminal of the push/pull-type control chip, and the positive terminal (P) thereof is connected to the base of a transistor switch. The first acceleration diode is used to speed up the cutoff action of the transistor switch. The emitter of the transistor switch is connected to a reference terminal, and the collector thereof is connected to the control terminal of the second electronic switch and to a DC power source via a first resistor. The second resistor is in shunt with the first acceleration diode for restriction of the base current of the transistor switch. The negative terminal (N) of the second acceleration diode is connected to the other output terminal of the push/pull-type control chip, and the positive terminal (P) thereof is connected to the control terminal of the first electronic switch via a coupling capacitor. The second acceleration diode is used to speed up the conduction action of the first electronic switch. The third resistor is in shunt with the second acceleration diode for current restriction of the control terminal of the first electronic switch.

The drive circuit further comprises a Zener diode and a fourth resistor. The positive terminal (P) of the Zener diode is connected to the control terminal of the first electronic switch, and the negative terminal (N) thereof is connected to the DC power source. The Zener diode is used to avoid a sudden, too-large spike voltage to burn out the first electronic switch. The fourth resistor is in shunt with the Zener diode to provide the Zener voltage.

The present invention provides a circuit making use of a push/pull-type control chip to drive a half bridge-type inverter circuit. The circuit uses a drive circuit to receive control signals of the push/pull-type control chip to turn switching actions of the half bridge-type switch assembly composed of two electronic switches.

The circuit of the present invention connects a drive circuit to a conventional half bridge-type inverter circuit with a push/pull-type control chip matched for control, hence having a higher flexibility in practical use without being limited by the control chip. Moreover, it is only necessary to use the push/pull-type control chip for simultaneous control of push/pull-type inverter circuit and half bridge-type inverter circuit.

BRIEF DESCRIPTION OF THE DRAWINGS

The various objects and advantages of the present invention will be more readily understood from the following detailed description when read in conjunction with the appended drawing, in which.

DETAILED DESCRIPTION OF THE PREFERRED EMBODIMENTS

Figure 1:
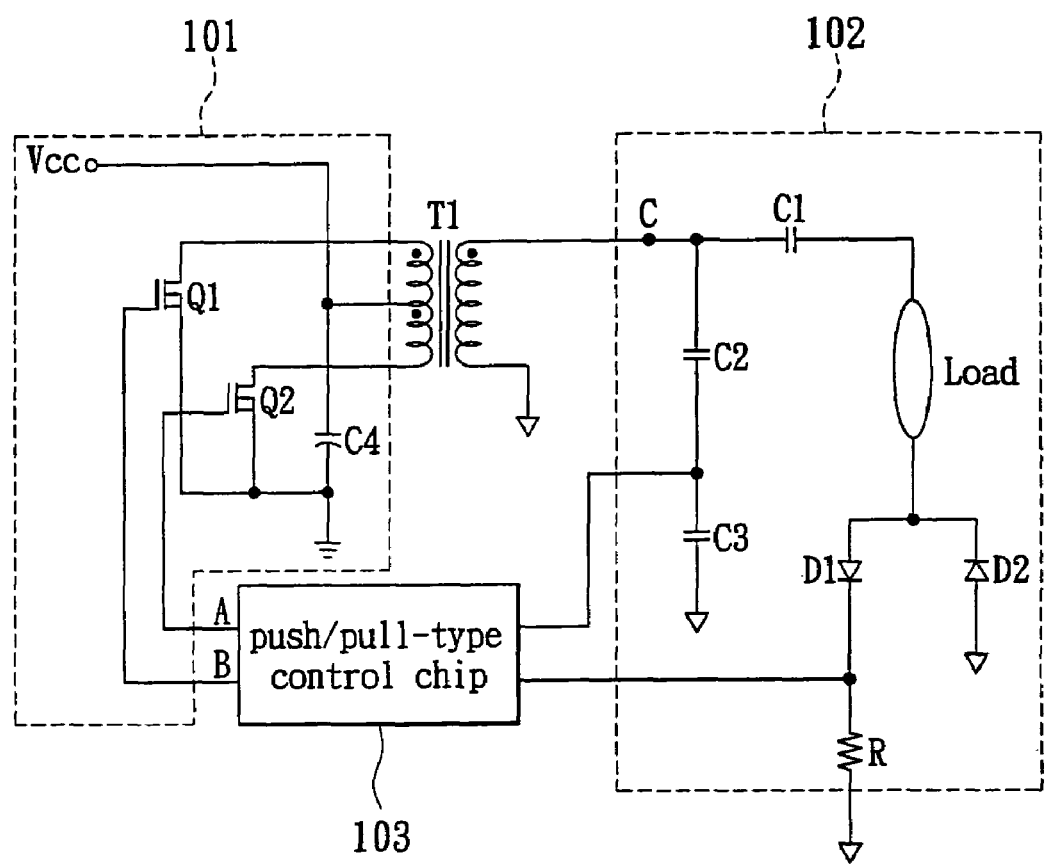
FIG. 1 is a circuit diagram showing how a conventional push/pull-type inverter circuit drives a load.
Figure 2:
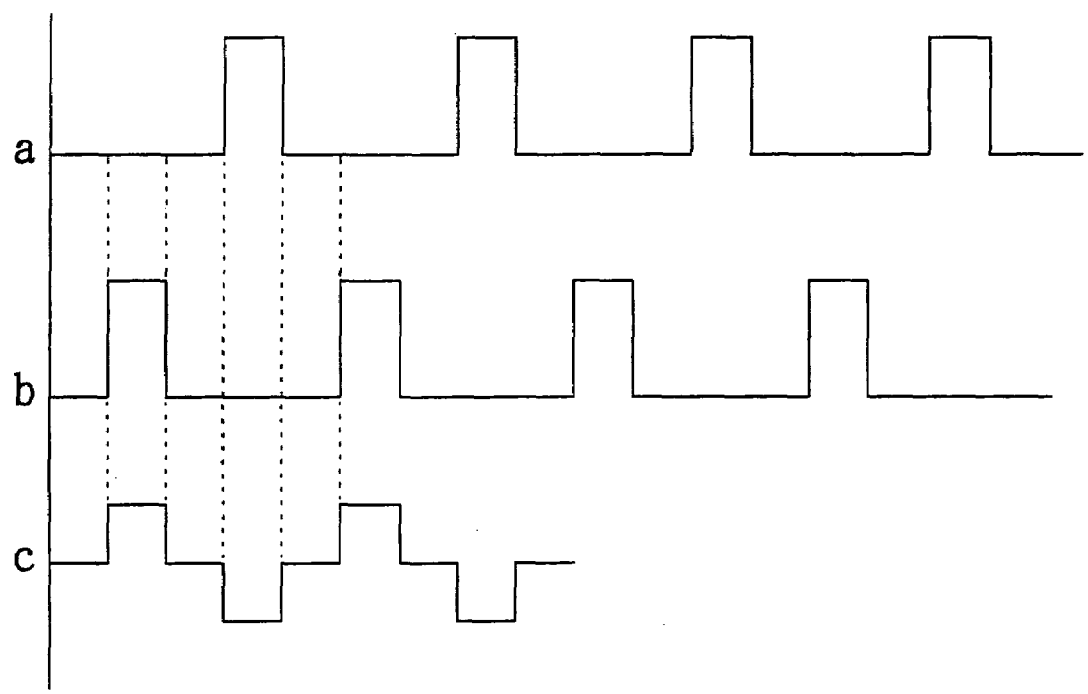
FIG. 2 is a waveform diagram of control signals output by a conventional push/pull-type control chip and an output voltage at the load end.
Figure 3:
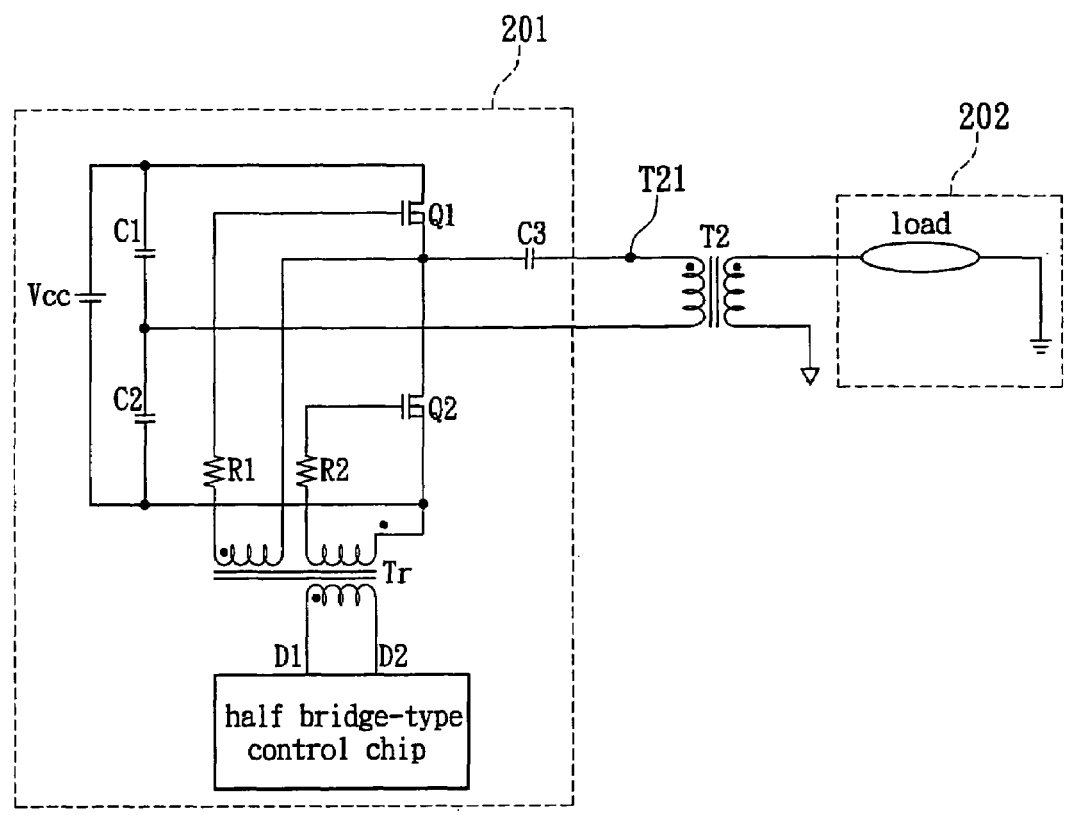
FIG. 3 is a circuit diagram showing how a conventional half bridge-type inverter circuit drives a load.
Figure 4:
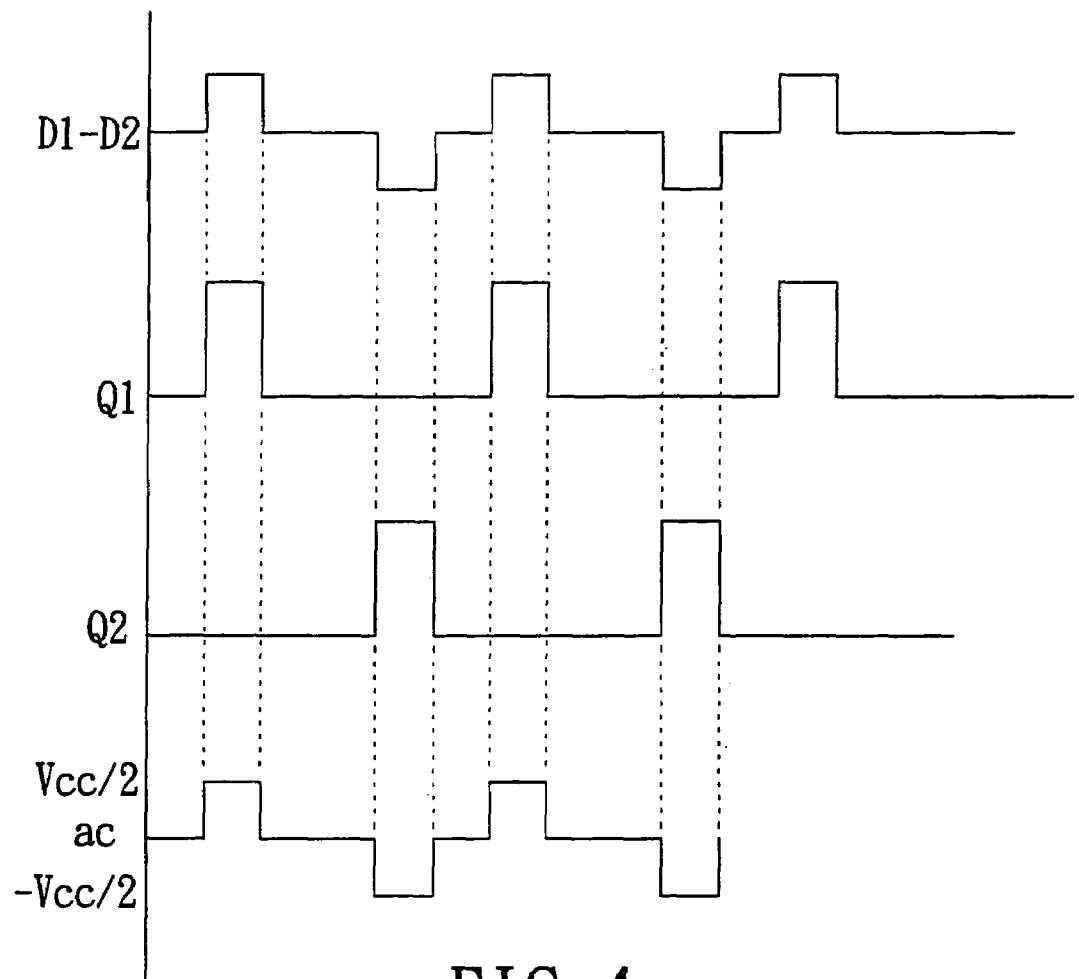
FIG. 4 is a waveform diagram of control signals output by a conventional half bridge-type control chip and an output voltage at the load end.
Figure 5:
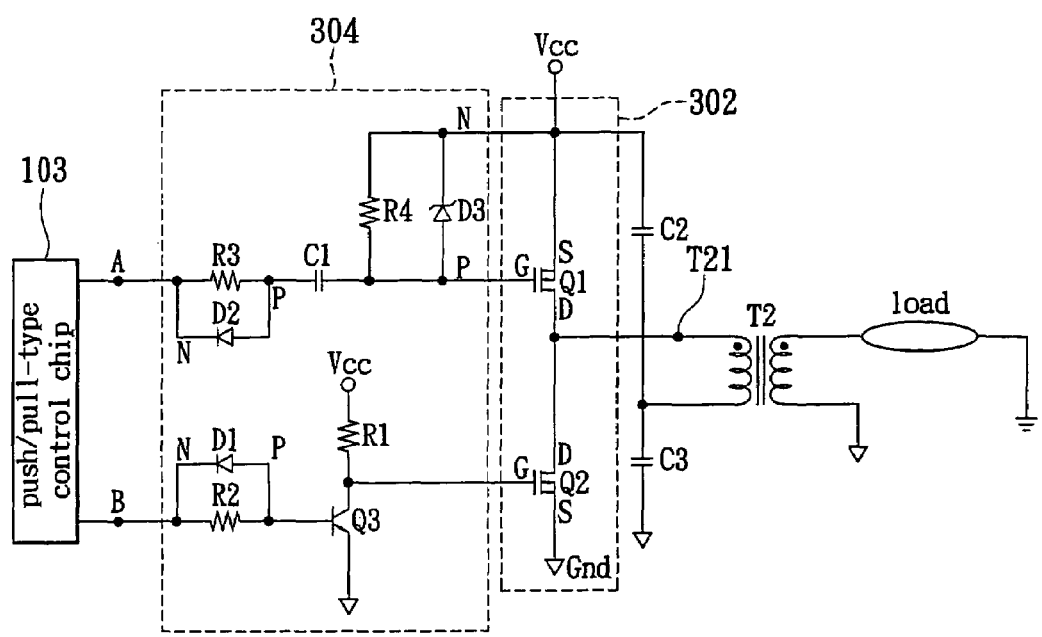
FIG. 5 is a circuit diagram of a first embodiment of the present invention.

As shown in FIG. 5, the present invention provides a circuit making use of a push/pull-type control chip to drive a half bridge-type inverter circuit. The circuit is connected to a primary side of a transformer T2 for converting a DC power source into an AC power source ac. The AC power source ac provides energy for actions of the load via the transformer T2. The peak-to-peak value of the above AC power source ac is the voltage Vcc of the DC power source.

Reference is again made to FIG. 5. The circuit making use of a push/pull-type control chip to drive a half bridge-type inverter circuit of the present invention comprises a push/pull-type control chip 103, a drive circuit 304, a half bridge-type switch assembly 302 and two capacitors (C2, C3). The push/pull-type control chip 103 has two output terminals A and B for outputting two control signals. The drive circuit 304 has two input terminals and two output terminals. The two input terminals are connected to the two output terminals A and B of the push/pull-type control chip 103 and controlled by the push/pull-type control chip 103. The half bridge-type switch assembly 302 is composed of two electronic switches Q1 and Q2, each having a control terminal G. The two control terminals G are connected to the two output terminals of the drive circuit 304 and driven by the drive circuit 304 for switching the DC power source Vcc to the AC power source sent to the primary side of the transformer T2, respectively. The electronic switch Q1 is a p-channel FET, while the electronic switch Q2 is an n-channel FET.

Reference is again made to FIG. 5. The source S of the electronic switch Q1 is connected to the DC power source Vcc. The source S of the electronic switch Q2 is connected to a reference terminal Gnd. The drains D of the electronic switches Q1 and Q2 are connected to one terminal of the primary side of the transformer T2. The other terminal of the primary side of the transformer T2 is connected to the reference terminal Gnd via the capacitor C3 and to the DC power source Vcc via the capacitor C2. The control terminals G of the electronic switches Q1 and Q2 are connected to the two output terminals of the drive circuit 304, respectively. The above two electronic switches Q1 and Q2 are connected to form the half bridge-type switch assembly. The two electronic switches Q1 and Q2 are driven in the positive half cycle or the negative half cycle to form the AC power source ac at the terminal T21 of the primary side of the transformer T2.

Reference is again made to FIG. 5. The drive circuit 304 is used to drive the two electronic switches Q1 and Q2. The drive circuit 304 comprises a first acceleration diode D1, a second resistor R2, a second acceleration diode D2, and a third resistor R3. The negative terminal (N) of the first acceleration diode D1 is connected to the output terminal B of the push/pull-type control chip 103, and the positive terminal (P) thereof is connected to the base of a transistor switch Q3. The emitter of the transistor switch Q3 is connected to a reference terminal, and the collector thereof is connected to the control terminal G of the electronic switch Q2 and to the DC power source via a first resistor R1. The second resistor R2 is in shunt with the first acceleration diode D1. The negative terminal (N) of the second acceleration diode D2 is connected to the output terminal A of the push/pull-type control chip 103, and the positive terminal (P) thereof is connected to the control terminal G of the electronic switch Q1 via a coupling capacitor C1. The third resistor R3 is in shunt with the second acceleration diode D2.

The drive circuit further comprises a Zener diode D3 and a fourth resistor R4. The positive terminal (P) of the Zener diode D3 is connected to the control terminal G of the electronic switch Q1, and the negative terminal (N) thereof is connected to the DC power source Vcc. The fourth resistor is in shunt with the Zener diode D3.

Figure 6:
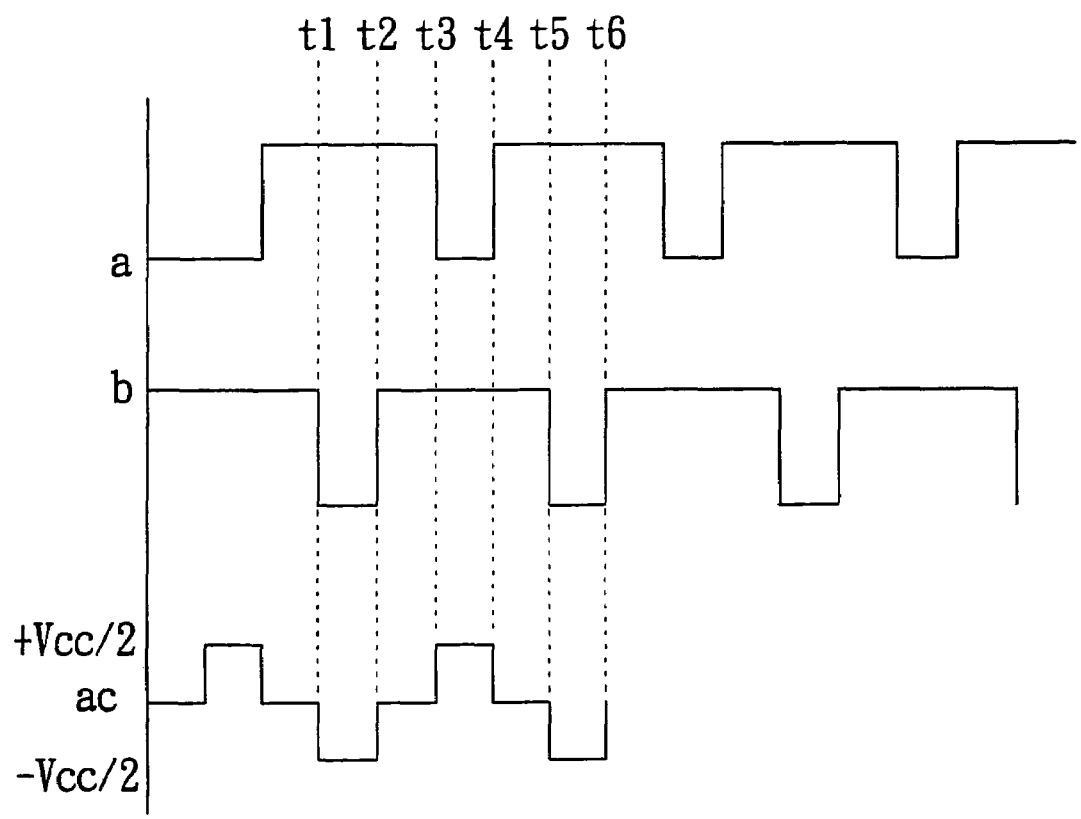
FIG. 6 is a waveform diagram of output signals of a push/pull-type control chip and the AC voltage according to the first embodiment of the present invention.

Reference is made to FIG. 6 as well as FIG. 5. The output terminal A of the push/pull-type control chip 103 outputs a first control signal a, and the output terminal B thereof outputs a second control signal b. The first and second control signals a and b have a duty cycle larger than 50% like the clock of POUT1 and POUT2 of the chip of type BIT3015 produced by Beyond Innovation Technology. The terminal T21 at the primary side of the transformer T2 can get an AC voltage waveform ac with a peak-to-peak value Vcc of the DC power source.

Reference is made to FIG. 6 as well as FIG. 5. At time from t1 to t2, the first control signal a is at the high level, while the second control signal b is at the low level. The first control signal a is sent to the control terminal G of the electronic switch Q1 via the third resistor R3 and the coupling capacitor C1 to turn the electronic switch Q1 off.

The second control signal b is sent to the base of the transistor switch Q3 via the first acceleration diode D1 and the second resistor R2 for turning the transistor switch Q3 off so that the DC power source Vcc can be directly sent to the control switch G of the electronic switch Q2 via the first transistor R1 for driving the electronic switch Q2 on. The above first acceleration diode D1 is used to speed up the cutoff action of the transistor switch Q3 and the conduction on action of the electronic switch Q2. At this time, the electronic switch Q2 is on, while the electronic switch Q1 is off. Therefore, electric energy stored in the capacitor C3 can be sent to the primary side of the transformer T2 to obtain a negative voltage −Vcc/2 of the AC voltage waveform ac at the terminal T21. In the above illustration, the electronic switches Q1 and Q2 are driven at the negative half cycle.

Reference is made to FIG. 6 as well as FIG. 5. At time from t2 to t3, the first control signal a is still kept at the high level, while the second control signal b rises from the low level to the high level. The base of the transistor switch Q3 thus accepts the control signal at the high level to be turned on. Therefore, the control terminal G of the electronic switch Q2 accepts a low-level signal of the reference terminal Gnd so that the electronic switch Q2 is turned off. Because the first control signal a is still kept at the high level, the electronic switch Q1 is still off. In other words, at time from t2 to t3, both the electronic switches Q1 and Q2 are off. The primary side of the transformer T2 is thus open-circuited so that energy stored in the transformer T2 can be discharged. This is the energy discharge state. Therefore, the terminal T21 of the primary side of the transformer T2 receives a zero voltage of the AC voltage waveform ac.

Reference is made to FIG. 6 as well as FIG. 5. At time from t3 to t4, the first control signal a drops from the high level to the low level, while the second control signal b is still kept at the high level. The first control signal a is sent to the control terminal G of the electronic switch Q1 via the second acceleration diode D2 and the coupling capacitor C1 to turn the electronic switch Q1 on. The second acceleration diode D2 is used to speed up the conduction on action of the electronic switch Q1. Because the second control signal b is still kept at the high level, the electronic switch Q2 is still off. In other words, at time from t3 to t4, the electronic switch Q1 is on, while the electronic switch Q2 is off so that electric energy stored in the capacitor C2 can be sent to the primary side of the transformer T2 to obtain a positive voltage +Vcc/2 of the AC voltage waveform ac at the terminal T21. In the above illustration, the electronic switches Q1 and Q2 are driven at the positive half cycle.

Reference is made to FIG. 6 as well as FIG. 5. At time from t4 to t5, the first control signal a rises from the low level to the high level, while the second control signal b is still kept at the high level. The states of the electronic switches Q1 and Q2 are the same as those at time from t2 to t3. Both the electronic switches Q1 and Q2 are off. Therefore, the primary side of the transformer T2 is open-circuited so that energy stored in the transformer T2 can be discharged. This is the energy discharge state. Therefore, the terminal T21 of the primary side of the transformer T2 receives a zero voltage of the AC voltage waveform ac.

Reference is made to FIG. 5. The Zener diode D3 is used to avoid a sudden, too-large spike voltage to burn out the electronic switch Q1. The fourth resistor R4 is in shunt with the Zener diode to provide the Zener voltage.

Reference is made to FIG. 6 as well as FIG. 5. At time from t5 to t6, the action of the circuit making use of a push/pull-type control chip to drive a half bridge-type inverter circuit of the present invention and the voltage waveform ac obtained at the terminal T21 of the primary side of the transformer T2 repeats that at time from t1 to t2. As stated above, the peak-to-peak value of the obtained AC power source is the voltage Vcc of the DC power source. Moreover, the AC power source is boosted and converted to the secondary side of the transformer T2 to provide energy for the load.

Figure 7:
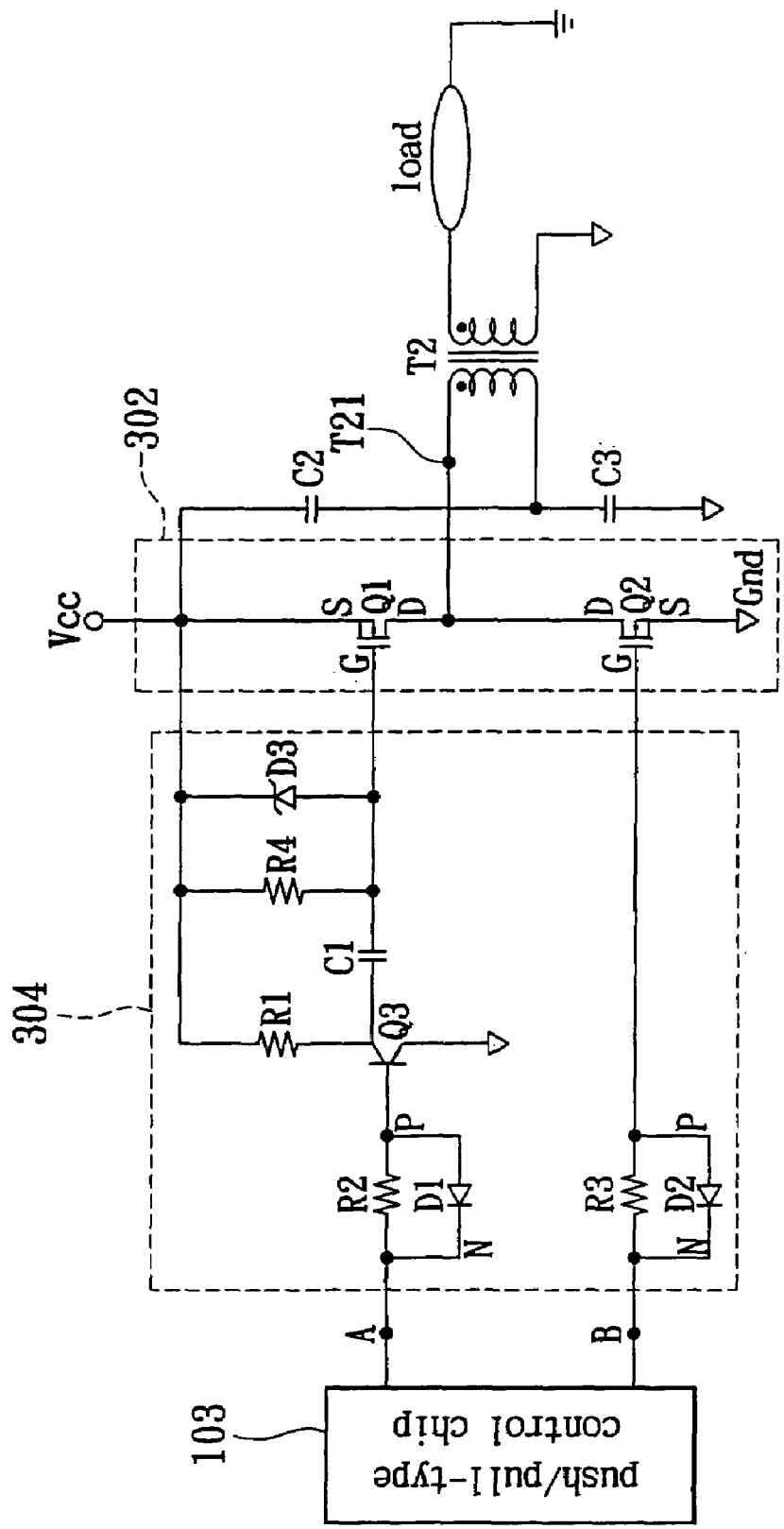
FIG. 7 is a circuit diagram of a second embodiment of the present invention.

Reference is made to FIG. 7 as well as FIG. 5. The differences between the circuit shown in FIG. 7 and the circuit shown in FIG. 5 are described below. The negative terminal (N) of the second acceleration diode D2 is moved from the output terminal A to the output terminal B of the push/pull-type control chip 103. The positive terminal (P) of the second acceleration diode D2 is moved to the control terminal (G) of the electronic switch Q2. The third resistor R3 is also moved to be in shunt with the second acceleration diode D2. The negative terminal (N) of the first acceleration diode D1 is moved from the output terminal B to the output terminal A of the push/pull-type control chip 103. The positive terminal (P) of the first acceleration diode D1 is also connected to the base of the transistor switch Q3. The emitter of the transistor switch Q3 is also connected to the reference terminal. The collector of the transistor switch Q3 is moved from the control terminal G of the electronic switch Q2 to the coupling capacitor C1 and to the control terminal G of the electronic switch Q1 via the coupling capacitor C1. The collector of the transistor switch Q3 is also connected to the DC power source Vcc via the first resistor R1. Other components shown in FIG. 7 are the same as those shown in FIG. 5.

Figure 8:
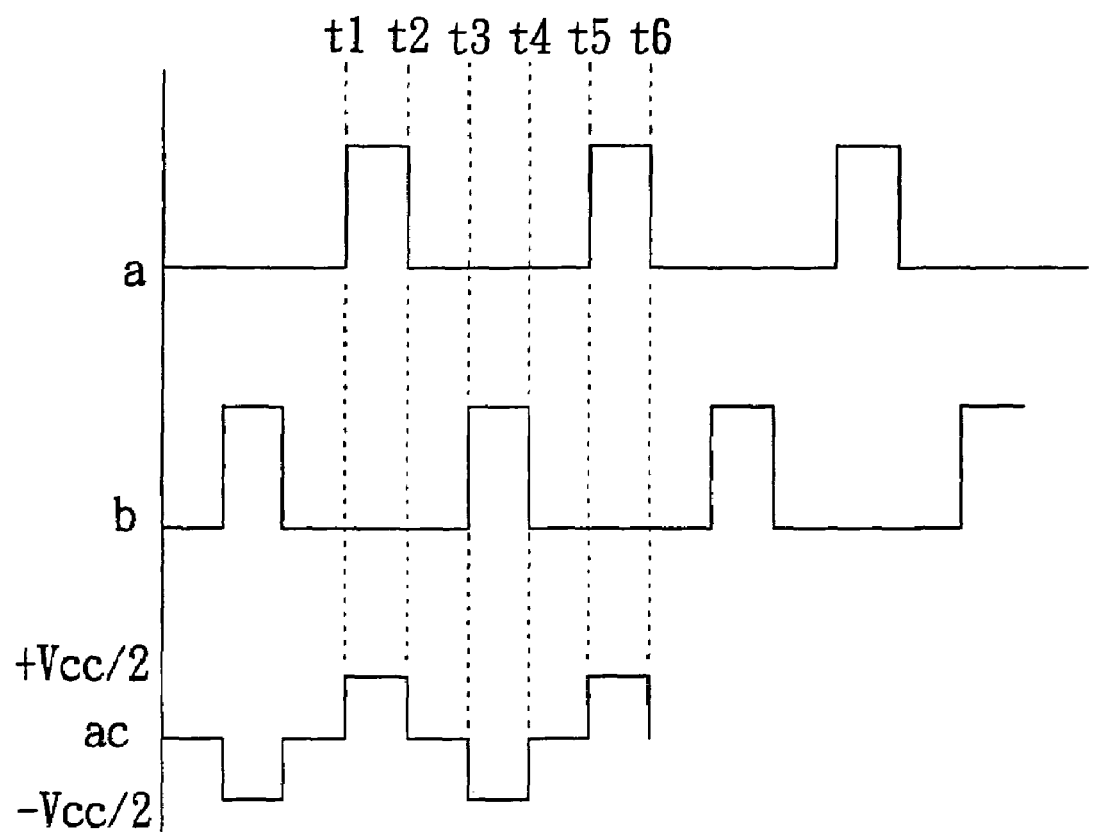
FIG. 8 is a waveform diagram of output signals of a push/pull-type control chip and the AC voltage according to the second embodiment of the present invention.

Reference is made to FIG. 8 as well as FIG. 7. The push/pull-type control chip 103 is a chip of type LX1686, LX1688 or LX1691 produced by Linfinity (Microsemi) Corporation, a chip of type 02-9RR produced by O2Micro International Limited, or a chip of type BIT3494 produced by Beyond Innovation Technology. As shown in FIG. 8, the output terminal A of the push/pull-type control chip 103 outputs a first control signal a, and the output terminal B thereof outputs a second control signal b. The first and second control signals a and b output by the push/pull-type control chip 103 are different from those shown in FIG. 6. The first and second control signals a and b have a duty cycle lower than 50% like the clock of NOUT1 and NOUT2 of the chip of type BIT3015 produced by Beyond Innovation Technology.

Because the circuit actions of the second embodiment are the same as those of the first embodiment of the present invention, they are not further described here. The terminal T21 at the primary side of the transformer T2 can obtain an AC power source whose voltage waveform ac has a peak-to-peak value Vcc of the DC power source. The AC power source is then boosted and converted to the secondary side of the transformer T2 to provide energy for the load.

To sum up, the present invention provides a circuit making use of a push/pull-type control chip to drive a half bridge-type inverter circuit. The circuit connects a drive circuit 304 to a conventional half bridge-type inverter circuit with a push/pull-type control chip 103 matched for control, hence having a higher flexibility in practical use. Moreover, it is only necessary to use the push/pull-type control chip 103 for simultaneous control of push/pull-type inverter circuit and half bridge-type inverter circuit.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

We claim:

1. A circuit making use of a push/pull-type control chip to drive a half bridge-type inverter circuit, said circuit being connected at a primary side of a transformer for converting a DC power source into an AC power source, said circuit comprising:
    a push/pull-type control chip having two output terminals;
    a drive circuit having two input terminals and two output terminals, said two input terminals being connected with said two output terminals of said push/pull-type control chip and controlled by said push/pull-type control chip; and
    a half bridge-type switch assembly composed of two electronic switches each having a control terminal, said control terminals being connected to two output terminals of said drive circuit and driven by said drive circuit to convert said DC power source into said AC power source sent to the primary side of said transformer, said drive circuit including:
    a first acceleration diode, wherein a negative terminal thereof is connected to one of said output terminals of said push/pull-type control chip and a positive terminal thereof is connected to a base of a transistor switch, an emitter of said transistor switch being connected to a reference terminal, and a collector of said transistor switch being connected to said control terminal of one of said electronic switch and to said DC power source via a first resistor;
    a second resistor in shunt with said first acceleration diode;
    a second acceleration diode, wherein a negative terminal thereof is connected to another one of said output terminals of said push/pull-type control chip and a positive terminal thereof is connected to said control terminal of another one of said electronic switches via a coupling capacitor; and
    a third resistor in shunt with the second acceleration diode.

2. The circuit making use of a push/pull-type control chip to drive a half bridge-type inverter circuit as claimed in claim 1, wherein said drive circuit further comprises a Zener diode and a fourth resistor in shunt with said Zener diode, a positive terminal of said Zener diode is connected to said control terminal of another one of said electronic switches, and a negative terminal of said Zener diode is connected to said DC power source.

3. A circuit making use of a push/pull-type control chip to drive a half bridge-type inverter circuit, said circuit being connected at a primary side of a transformer for converting a DC power source into an AC power source, said circuit comprising:
    a push/pull-type control chip having two output terminals;
    a drive circuit having two input terminals and two output terminals, said two input terminals being connected with said two output terminals of said push/pull-type control chip and controlled by said push/pull-type control chip; and
    a half bridge-type switch assembly composed of two electronic switches each having a control terminal, said control terminals being connected to two output terminals of said drive circuit and driven by said drive circuit to convert said DC power source into said AC power source sent to the primary side of said transformer, said drive circuit including:
    a first acceleration diode, wherein a negative terminal thereof is connected to one of said output terminals of said push/pull-type control chip and a positive terminal thereof is connected to a base of a transistor switch, an emitter of said transistor switch being connected to a reference terminal, and a collector of said transistor switch being connected to said control terminal of one of said electronic switch via a coupling capacitor and to said DC power source via a first resistor;
    a second resistor in shunt with said first acceleration diode;
    a second acceleration diode, wherein a negative terminal thereof is connected to another one of said output terminals of said push/pull-type control chip and a positive terminal thereof is connected to said control terminal of another one of said electronic switches; and
    a third resistor in shunt with the second acceleration diode.

4. The circuit making use of a push/pull-type control chip to drive a half bridge-type inverter circuit as claimed in claim 3, wherein said drive circuit further comprises a Zener diode and a fourth resistor in shunt with said Zener diode, a positive terminal of said Zener diode is connected to said control terminal of another one of said electronic switches, and a negative terminal of said Zener diode is connected to said DC power source.

* * * * *